(12) United States Patent
Chu

(10) Patent No.: US 8,583,860 B2
(45) Date of Patent: *Nov. 12, 2013

(54) BLOCK MANAGEMENT METHOD FOR FLASH MEMORY AND CONTROLLER AND STORAGE SYSTEM USING THE SAME

(71) Applicant: Phison Electronics Corp., Miaoli (TW)

(72) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,846

(22) Filed: Feb. 19, 2013

(65) Prior Publication Data

US 2013/0166830 A1    Jun. 27, 2013

Related U.S. Application Data

(63) Continuation of application No. 12/129,299, filed on May 29, 2008, now Pat. No. 8,407,397.

(30) Foreign Application Priority Data

Feb. 29, 2008    (TW) ................................ 97106983 A

(51) Int. Cl.
*G06F 12/00*    (2006.01)

(52) U.S. Cl.
USPC ............................ 711/103; 711/154; 711/173

(58) Field of Classification Search
USPC .......................................... 711/103, 154, 173
See application file for complete search history.

(56) References Cited

U.S. PATENT DOCUMENTS

2007/0276987 A1*  11/2007  Luo et al. ...................... 711/103

* cited by examiner

*Primary Examiner* — Matthew Bradley
(74) *Attorney, Agent, or Firm* — J.C. Patents

(57) ABSTRACT

A block management method for managing a mapping relationship between a plurality of logical blocks and a plurality of physical blocks of a flash memory is provided. The block management method includes: grouping the logical blocks into a plurality of logical zones; recording the mapping relationship between each logical block in each logical zone and all the data physical blocks among the physical blocks in a corresponding logical zone table in unit of the logical zones; and recording all the no-data physical blocks among the physical blocks with a single no-data physical block table. Thereby, the logical blocks can be mapped to all the physical blocks so that frequent access to specific physical blocks can be avoided when a user writes data into a specific logical zone frequently, and accordingly the lifespan of the flash memory can be prolonged.

20 Claims, 8 Drawing Sheets

BLOCK MANAGEMENT METHOD FOR FLASH MEMORY AND CONTROLLER AND STORAGE SYSTEM USING THE SAME

CROSS-REFERENCE TO RELATED APPLICATION

This is a continuation application of patent application Ser. No. 12/129,299, filed on May 29, 2008, which claims the priority benefit of Taiwan patent application serial no. 97106983, filed on Feb. 29, 2008. The entirety of each of the above-mentioned patent applications is hereby incorporated by reference herein and made a part of this specification.

BACKGROUND

1. Technology Field

The present invention generally relates to a memory management method, in particular, to a block management method for managing a large number of physical blocks in a flash memory with limited system resources and a flash memory controller and a flash memory storage system using the same.

2. Description of Related Art

Along with the widespread of digital cameras, camera phones, MP3, and MP4 in recently years, the consumers' demand to storage media has increased drastically too. Flash memory is one of the most adaptable memories for such portable multi-media devices due to its characteristics such as data non-volatility, low power consumption, small volume, and non-mechanical structure. Besides being applied in foregoing portable devices, flash memory is also broadly applied to external products such as flash cards and flash drives. Thereby, flash memory has become one of the most focused electronic products in recent years and the development thereof is going toward high storage capacity and long lifespan.

When a memory cell in a flash memory is programmed, the state thereof can only be changed unidirectionally (for example, from "1" to "0"). Thus, while writing data into a block of a flash memory, the block has to be erased before being programmed. Generally speaking, physical blocks in a flash memory include data physical blocks which record valid data and no-data physical blocks which record no data or the data recorded therein has been marked as invalid data. While writing data into a flash memory, the flash memory storage system substitutes data physical blocks which contain old data with no-data physical blocks, so as to improve the programming (i.e. writing and erasing) efficiency. Since the physical blocks which are used for actually recording data are alternated continuously (i.e. the substitution between data physical blocks and no-data physical blocks), logical blocks of the flash memory are assigned in the flash memory storage system and which are mapped to the continuously substituted physical blocks to be accessed by the flash memory storage system.

In order to manage the mappings between the logical blocks and the physical blocks in a flash memory with limited system resources, the physical blocks in the flash memory are usually grouped into a plurality of logical zones, and the physical blocks are usually grouped into a plurality of physical zones. FIG. 1 is a diagram illustrating how logical blocks and physical blocks are respectively grouped into corresponding logical zones and physical zones according to a conventional technique. Referring to FIG. 1, the logical zones LZ1, LZ2, ..., and LZP are respectively corresponding to the physical zones PZ1, PZ2, ..., and PZP, and the logical blocks in each of the logical zones LZ1, LZ2, ..., and LZP are only corresponding to the physical blocks in the corresponding physical zone PZ1, PZ2, ..., or PZP, and the data physical blocks and no-data physical blocks in each physical zone are only alternatively substituted in this physical zone. For example, the logical blocks 1-1~1-k are only corresponding to the physical blocks 1-0~1-L, and the data physical blocks and the no-data physical blocks in the physical zone PZ1 are only alternatively substituted in the physical blocks 1-0~1-L. In other words, in management of blocks, each logical zone and the corresponding physical zone are operated independently. Thereby, when the flash memory storage system is about to write data into a flash memory, only the logical zone for writing the data and the corresponding physical zone thereof are managed.

However, according to a conventional block management method, when a particular logical zone is accessed for the first time every time after the flash memory storage system is re-started or turned on, the flash memory storage system has to spend a lot of time to establish the mapping relationship between each logical zone and the corresponding physical zone.

Moreover, when the number of damaged physical blocks in a physical zone exceeds a particular number and accordingly there is not enough no-data physical blocks for the substitution, the physical blocks in the entire physical zone cannot be used for storing data any more. As a result, the production yield may be reduced or insufficient available storage space of the flash memory storage system may be caused.

Furthermore, when the logical blocks in a particular logical zone are accessed frequently, the erasing number of the physical blocks in the physical zone corresponding to the logical zone will be increased and accordingly the lifespan of the physical blocks in the corresponding physical zone will be shortened.

SUMMARY

Accordingly, the present invention is directed to a block management method which improves the yield of a flash memory and prolongs the lifespan thereof.

The present invention is directed to a flash memory controller, wherein the flash memory controller executes a block management method to improve the yield of a flash memory and prolong the lifespan thereof.

The present invention is directed to a flash memory storage system, wherein a flash memory controller of the flash memory storage system executes a block management method to improve the yield of a flash memory and prolong the lifespan thereof.

The present invention provides a block management method suitable for managing a mapping relationship between a plurality of logical blocks and a plurality of physical blocks of a flash memory. The block management method includes: grouping the logical blocks into a plurality of logical zones; recording the mapping relationship between each logical block in each logical zone and all the data physical blocks among the physical blocks in a corresponding logical zone table in unit of the logical zones; and recording all the no-data physical blocks among the physical blocks with a single no-data physical block table.

According to an embodiment of the present invention, the block management method further includes recording all the bad physical blocks among the physical blocks with a bad physical block table.

According to an embodiment of the present invention, the block management method further includes selecting a physical block from all the no-data physical blocks according to the no-data physical block table for writing a data when the data is to be written into a logical block.

According to an embodiment of the present invention, the block management method further includes updating the physical block corresponding to the logical block to be written into the selected physical block in the corresponding logical zone table, deleting the selected physical block from the no-data physical block table, and adding the original physical block corresponding to the logical block to be written into the no-data physical block table.

The present invention provides a flash memory controller suitable for a flash memory storage system having a flash memory, wherein the flash memory has a plurality of logical blocks and a plurality of physical blocks. The flash memory controller includes a microprocessor unit, a flash memory interface, a buffer memory, and a memory management module. The flash memory interface is electrically connected to the microprocessor unit and used for accessing the flash memory. The buffer memory is electrically connected to the microprocessor unit and used for temporarily storing data. The memory management module is electrically connected to the microprocessor unit, wherein the memory management module groups the logical blocks into a plurality of logical zones, records the mapping relationship between each logical block in each logical zone and all the data physical blocks among the physical blocks in a corresponding logical zone table in unit of the logical zones, and records all the no-data physical blocks among the physical blocks with a no-data physical block table.

According to an embodiment of the present invention, the memory management module records all the bad physical blocks among the physical blocks with a bad physical block table.

According to an embodiment of the present invention, when a data is to be written into a logical block, the memory management module selects a physical block from all the no-data physical blocks according to the no-data physical block table for writing the data.

According to an embodiment of the present invention, the memory management module updates the physical block corresponding to the logical block to be written into the selected physical block in the corresponding logical zone table, deletes the selected physical block from the no-data physical block table, and adds the original physical block corresponding to the logical block to be written into the no-data physical block table.

According to an embodiment of the present invention, the flash memory is a single level cell (SLC) NAND flash memory or a multi level cell (MLC) NAND flash memory.

According to an embodiment of the present invention, the flash memory storage system is a USB flash drive, a flash memory card, or a solid state drive (SSD).

The present invention provides a flash memory storage system including a flash memory controller, a transmission interface, and a flash memory. The transmission interface is electrically connected to the flash memory controller and used for connecting to a host. The flash memory is electrically connected to the flash memory controller and used for storing data. The flash memory controller groups a plurality of logical blocks in the flash memory into a plurality of logical zones, records the mapping relationship between each logical block in each logical zone and all the data physical blocks among the physical blocks in the flash memory in a corresponding logical zone table in unit of the logical zones, and records all the no-data physical blocks among the physical blocks with a no-data physical block table.

According to an embodiment of the present invention, the flash memory controller records all the bad physical blocks among the physical blocks with a bad physical block table.

According to an embodiment of the present invention, when a data is to be written into a logical block, the flash memory controller selects a physical block from all the no-data physical blocks according to the no-data physical block table for writing the data.

According to an embodiment of the present invention, the flash memory controller updates the physical block corresponding to the logical block to be written into the selected physical block in the corresponding logical zone table, deletes the selected physical block from the no-data physical block table, and adds the original physical block corresponding to the logical block to be written into the no-data physical block table.

According to an embodiment of the present invention, the flash memory is a SLC NAND flash memory or a MLC NAND flash memory.

According to an embodiment of the present invention, the transmission interface is a PCI Express interface, a USB interface, an IEEE 1394 interface, a SATA interface, a MS interface, a MMC interface, a SD interface, a CF interface, or an IDE interface.

The present invention provides a flash memory controller having a storage unit, wherein the storage unit stores a program code which can be executed by a microprocessor unit of the flash memory controller to implement a block management process. The block management process is suitable for managing a mapping relationship between a plurality of logical blocks and a plurality of physical blocks of a flash memory. The block management process includes: grouping the logical blocks into a plurality of logical zones; recording the mapping relationship between each logical block in each logical zone and all the data physical blocks among the physical blocks in a corresponding logical zone table in unit of the logical zones; and recording all the no-data physical blocks among the physical blocks with a single no-data physical block table.

According to an embodiment of the present invention, the block management process further includes recording all the bad physical blocks among the physical blocks with a bad physical block table.

According to an embodiment of the present invention, the block management process further includes selecting a physical block from all the no-data physical blocks according to the no-data physical block table for writing a data when the data is to be written into a logical block.

According to an embodiment of the present invention, the block management process further includes updating the physical block corresponding to the logical block to be written into the selected physical block in the corresponding logical zone table, deleting the selected physical block from the no-data physical block table, and adding the original physical block corresponding to the logical block to be written into the no-data physical block table.

According to the present invention, a method for managing the physical blocks in a flash memory as a whole is adopted, so that frequent access to specific physical blocks is avoided when a user writes data into a specific logical zone repeatedly, and accordingly the lifespan of the flash memory is prolonged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
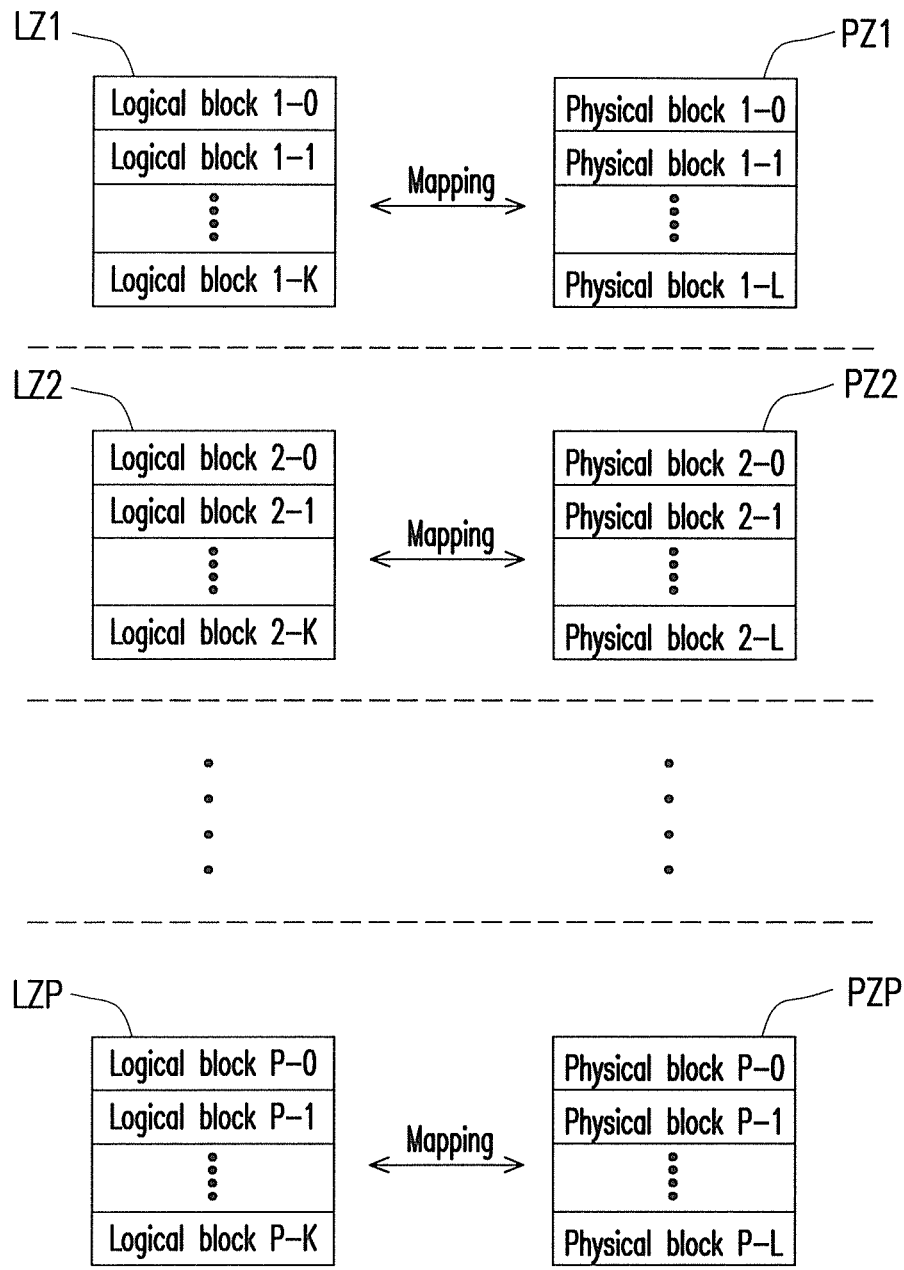
FIG. 1 is a concept map of block management according to a conventional technique.

Reference will now be made in detail to the present preferred embodiments of the invention, examples of which are illustrated in the accompanying drawings. Wherever possible, the same reference numbers are used in the drawings and the description to refer to the same or like parts.

The present invention provides a block management method for a flash memory in order to overcome at least one disadvantage of the conventional block management method described above, wherein all the physical blocks of a flash memory can be mapped to a logical block in each logical zone, and all the physical blocks (regardless of their zones) can be substituted alternatively. Thereby, frequent access to specific physical blocks when a user writes data into a specific logical zone frequently can be avoided and accordingly the lifespan of the flash memory can be prolonged. Below, embodiments of the present invention will be described in detail with reference to accompanying drawings.

Figure 2:
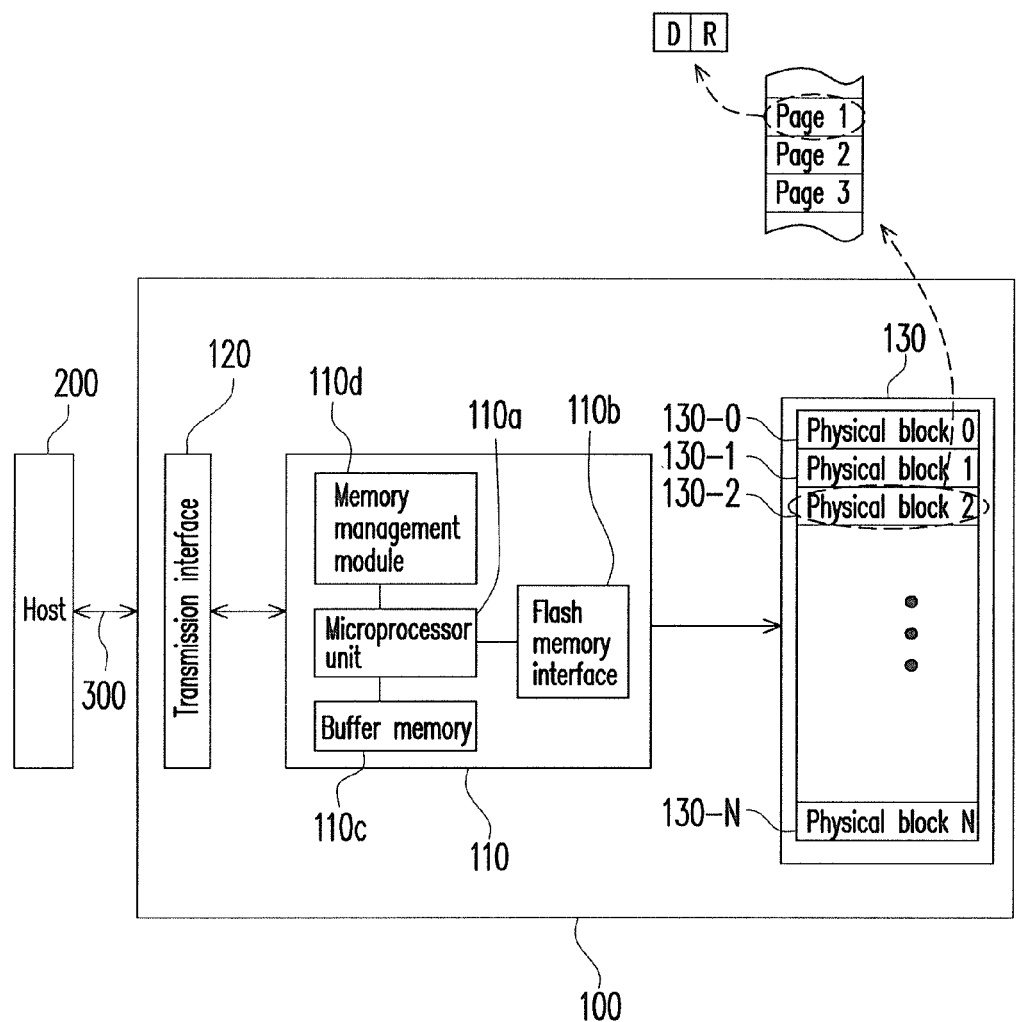
FIG. 2 is a schematic block diagram of a flash memory storage system according to an embodiment of the present invention.

FIG. 2 is a schematic block diagram of a flash memory storage system according to an embodiment of the present invention. Referring to FIG. 2, the flash memory storage system 100 includes a flash memory controller 110, a transmission interface 120, and a flash memory 130. The flash memory storage system 100 is usually used along with a host 200 so that the host 200 can write data into the flash memory storage system 100 or read data from the flash memory storage system 100. In the present embodiment, the flash memory storage system 100 is a flash drive; however, in another embodiment of the present invention, the flash memory storage system 100 may also be a flash memory card or a solid state drive (SSD).

The flash memory controller 110 controls the operations of the transmission interface 120 and the flash memory 130, such as data storing, reading, and erasing etc. The flash memory controller 110 includes a microprocessor unit 110a, a flash memory interface 110b, a buffer memory 110c, and a memory management module 110d.

The microprocessor unit 110a coordinates the operation between the flash memory interface 110b, the buffer memory 110c, and the memory management module 110d.

The flash memory interface 110b is electrically connected to the microprocessor unit 110a and used for accessing the flash memory 130. Namely, the data to be written by the host 200 into the flash memory 130 is converted into a format acceptable to the flash memory 130 by the flash memory interface 110b.

The buffer memory 110c is electrically connected to the microprocessor unit 110a and used for temporarily storing system data (for example, a logical-physical mapping table) or the data to be read or written by the host 200. In the present embodiment, the buffer memory 110c is a static random access memory (SRAM); however, the present invention is not limited thereto, and the buffer memory 110c may also be a dynamic random access memory (DRAM), a magnetoresistive random access memory (MRAM), a phase-change random access memory (PRAM), or other suitable memories.

Figure 6:
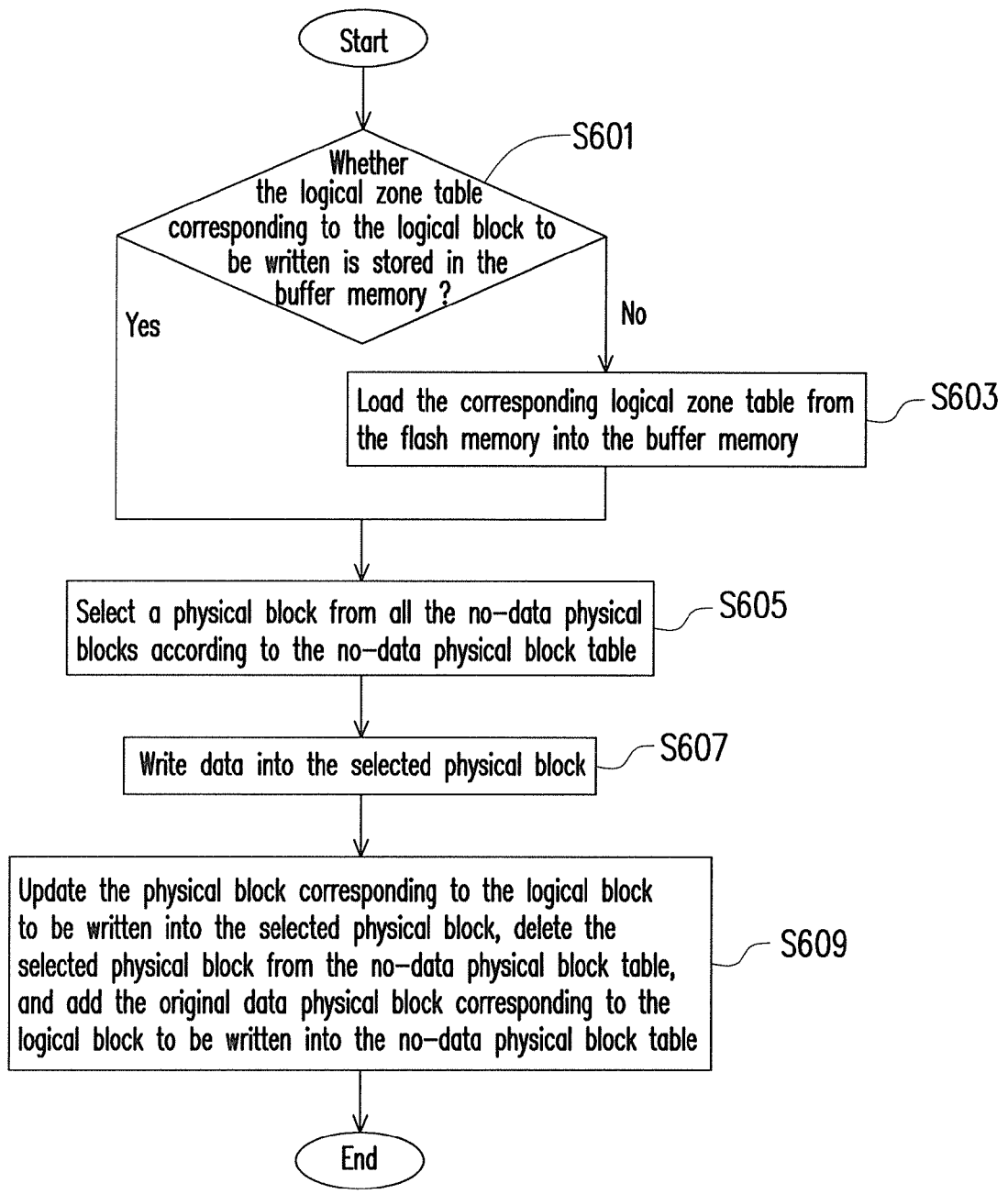
FIG. 6 is a flowchart illustrating how a data is written into a flash memory storage system according to an embodiment of the present invention.

The memory management module 110d is electrically connected to the microprocessor unit 110a. The memory management module 110d manages the flash memory 130, such as executes a wear levelling method, manages bad blocks, or maintains a mapping table etc. Particularly, in the present embodiment, the memory management module 110d executes a block management process (as shown in FIG. 6).

Additionally, the flash memory controller 110 may further include other general functional modules such as an error correction module or a power management module (not shown).

The transmission interface 120 is used for connecting to the host 200 through a bus 300. In the present embodiment, the transmission interface 120 is a PCI Express interface; however, the present invention is not limited thereto, and the transmission interface 120 may also be a USB interface, an IEEE 1394 interface, a SATA interface, a MS interface, a MMC interface, a SD interface, a CF interface, an IDE interface, or other suitable data transmission interfaces.

The flash memory 130 is electrically connected to the flash memory controller 110 and used for storing data. The flash memory 130 is substantially divided into a plurality of physical blocks 130-0~130-N. Generally speaking, data in a flash memory is erased in unit of physical blocks. Namely, each physical block contains the smallest number of memory cells which are erased together. Each physical block is usually divided into a plurality of (for example, 64, 128, or 256) pages. Page is usually the smallest programming unit. However, it should be noted that in some different flash memory designs, the smallest programming unit may also be sector, namely, a page has a plurality of sectors and each sector is served as the smallest programming unit. In other words, page is served as the smallest unit for reading and writing data. A page is usually divided into a user data area D and a redundant area R, wherein the user data area D is used for storing user data, and the redundant area R is used for storing system data (for example, an error correcting code (ECC)). Generally speaking, the user data area D has 512 bytes and the redundant area R has 16 bytes in order to correspond to the size of sectors in a disk drive. In other words, a page is a sector. However, a page may also be composed of a plurality of sectors. For example, a page may include four sectors. In the present embodiment, the flash memory 130 is a multi level cell (MLC) NAND flash memory; however, in another embodiment of the present invention, the flash memory 130 may also be a single level cell (SLC) NAND flash memory.

The operation of the flash memory 130 will be described according to the present invention with reference to accompanying drawings. It should be understood that the terms "select", "move", and "substitute" used in following description only refer to logical operations performed to a flash memory. In other words, the physical positions of the blocks in the flash memory are not changed; instead, these blocks in the flash memory are only operated logically.

Figure 3A:
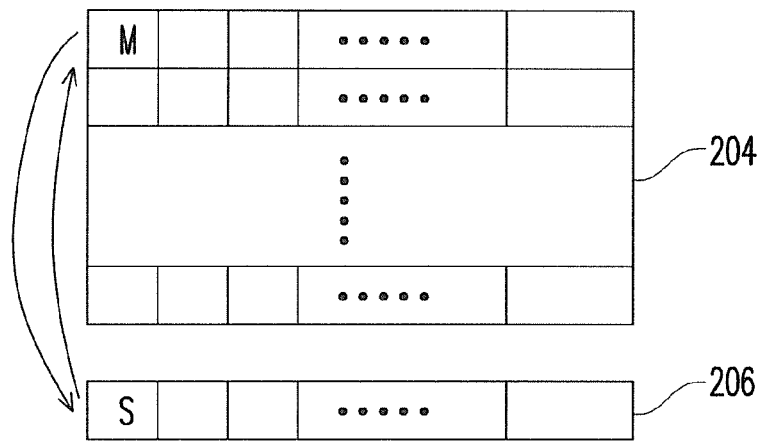
FIGS. 3A-3C are detailed block diagrams of a flash memory and the operation thereof according to an embodiment of the present invention.
Figure 3B:
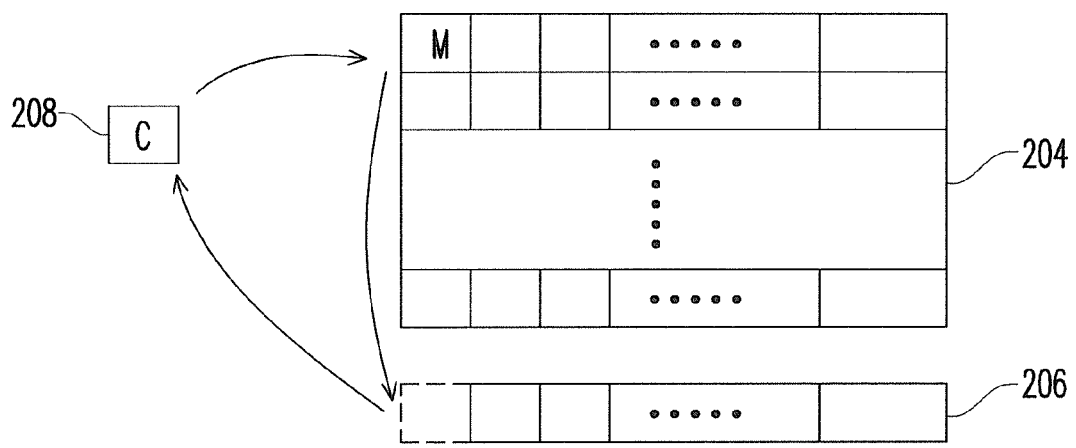
Figure 3C:
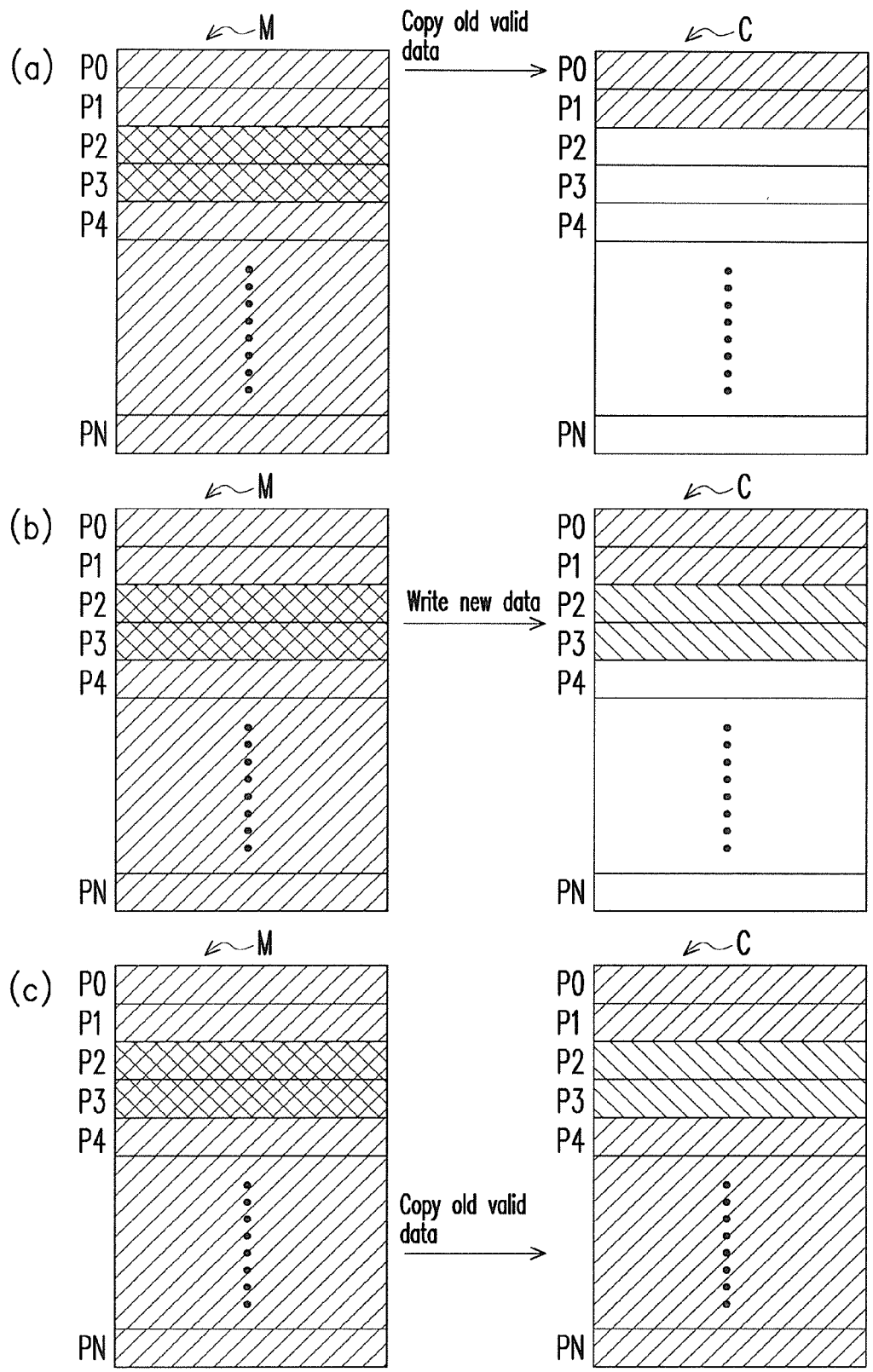

FIGS. 3A-3C are detailed block diagrams of the flash memory 130 and the operation thereof according to an embodiment of the present invention.

Referring to FIG. 3A, in the present embodiment, the physical blocks 130-1~130-N in the flash memory 130 are logically grouped into a data area 204 and a spare area 206 so as to program (i.e. write and erase) the flash memory 130 more efficiently. Generally speaking, more than 90% of the physical blocks in the flash memory 130 belong to the data area 204.

Physical blocks in the data area 204 (referred as data physical blocks thereinafter) are used for storing data, and these blocks are usually the physical blocks corresponding to the logical blocks operated by the host 200.

Physical blocks in the spare area 206 are used for substituting the data physical blocks. Accordingly, the physical blocks in the spare area 206 (referred as no-data physical blocks) are blank or available blocks, namely, no data is recorded in these blocks or data recorded in these blocks has been marked as invalid data.

To be specific, an erasing operation has to be performed before writing data to an address in which data has been recorded. However, as described above, data is written into a flash memory in unit of pages while erased from the same in unit of blocks. Since the erase unit is larger than the write unit, valid pages in a block have to be copied to another block before data in the block is erased.

Accordingly, to write a new data into a data physical block M in the data area 204 which already contains a data, a no-data physical block S is first selected from the spare area 206, and the valid data in the data physical block M is copied to the no-data physical block S and the new data is also written into the no-data physical block S. After that, the data physical block M is erased and moved to the spare area 206, and at the same time, the no-data physical block S is moved to the data area 204. Here the physical block M becomes a no-data physical block and the physical block S becomes a data physical block. It should be understood that moving the data physical block M to the spare area 206 and moving the no-data physical block S to the data area 204 are to logically link the data physical block M to the spare area 206 and logically link the no-data physical block S to the data area 204.

The blocks are further logically grouped into a substitute physical block 208 in order to use the flash memory 130 more efficiently. FIG. 3B illustrates another operation of the flash memory, and FIG. 3C is the detailed diagram of the operation in FIG. 3B.

Referring to FIG. 3B and FIG. 3C, the substitute physical block 208 is used for substituting the physical blocks in the data area 204. To be specific, when a physical block C is selected from the spare area 206 for substituting a data physical block M in the data area 204, the new data is written into the physical block C, but not all the valid data in the data physical block M is instantly moved to the physical block C to erase the data physical block M. To be specific, the valid data (i.e. pages P0 and P1) in the data physical block M before the address for writing the new data is copied into the physical block C (as shown in FIG. 3C(a)), and the new data (i.e. pages P2 and P3 in the physical block C) is also written into the physical block C (as shown in FIG. 3C(b)). Then, the physical block C containing part of the old valid data and the new data is temporarily linked as the substitute physical block 208. This is because the valid data in the data physical block M may become invalid in a next operation, and accordingly instantly moving all the valid data in the data physical block M to the physical block C may become meaningless. In the present example, the fact that a plurality of physical block addresses (PBAs) are mapped to one logical block address (LBA) is recorded in a logical-physical block mapping table, namely, the combination of the contents in the data physical block M and the physical block C is the content of the corresponding logical block.

Thereafter, the data physical block M and the physical block C are only integrated into one data physical block when the contents in the data physical block M and the physical block C are to be actually combined, so that the efficiency in using the physical blocks can be improved. For example, as shown in FIG. 3C(c), to integrate these blocks, the remaining valid data in the data physical block M (i.e. pages P4~PN) is coped into the physical block C, and the data physical block M is then erased and linked to the spare area 206 as a no-data physical block. Meanwhile, the physical block C is linked to the data area 204 as a data physical block, and by now the integration of these blocks is completed. Such a temporary mother-child relationship (between the data physical block M and the physical block C) can be determined according to the size of the buffer memory 110c in the flash memory controller 110, and in the present embodiment, five sets of mother-child blocks are described as an example.

Since the physical blocks 130-0~130-N in the flash memory 130 are categorized into data physical blocks, no-data physical blocks, and substitute physical blocks and these blocks are used for storing data alternatively, the flash memory 130 in the flash memory storage system 100 is designed with logical blocks, and these logical blocks are corresponding to the data physical blocks or the data physical blocks and the corresponding substitute physical blocks in the flash memory. To be specific, when the host 200 accesses the flash memory storage system 100, the host 200 reads or writes data by using LBAs, and the flash memory controller 110 writes data into or reads data from the physical blocks according to the mapping relationship between the logical blocks and the data physical blocks, as shown in FIGS. 3A~3C.

Figure 4:
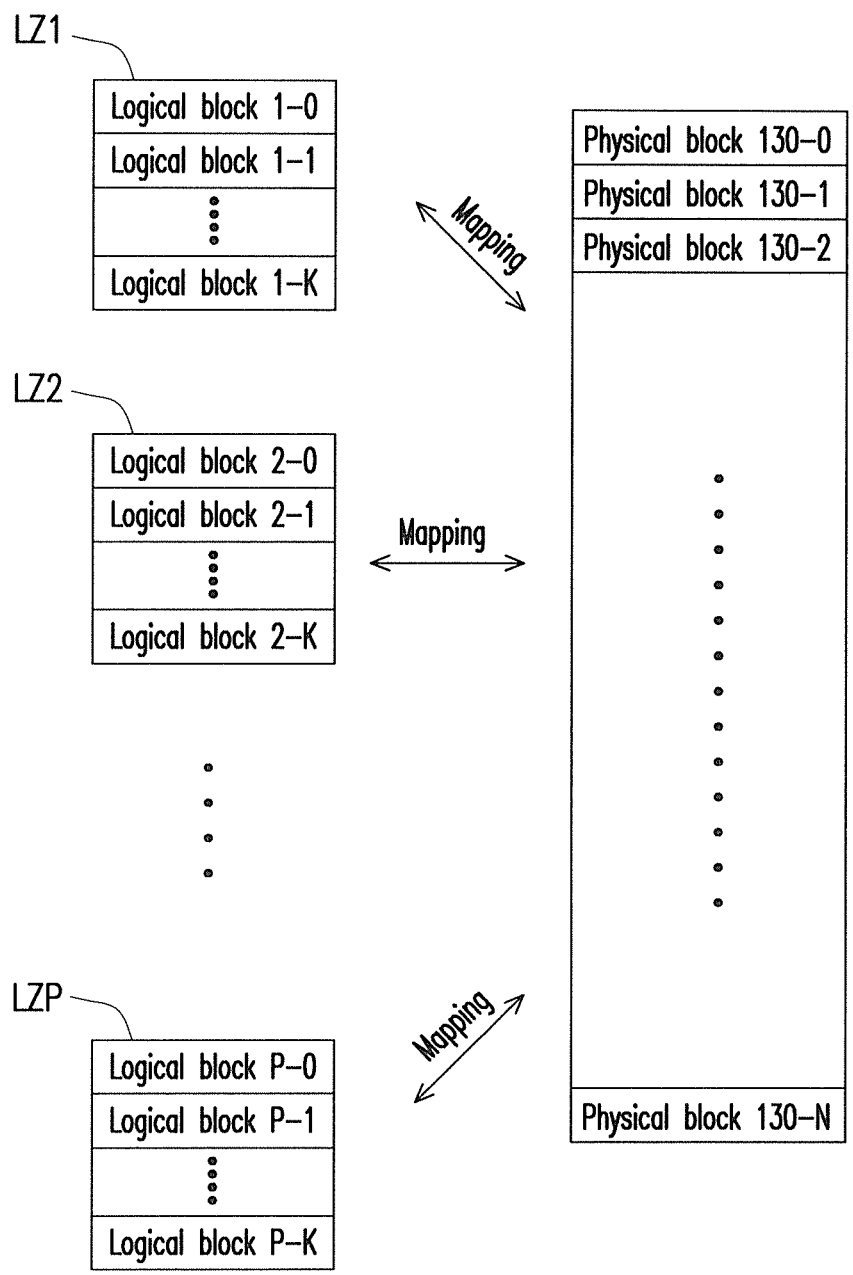
FIG. 4 is a concept map of block management according to an embodiment of the present invention.

It should be mentioned that in the present embodiment, the buffer memory 110c has limited storage space and accordingly the mapping relationship between all the logical blocks and the data physical blocks in the flash memory 130 cannot be stored all into the buffer memory 110c. Thus, according to the block management method provided by the present invention, the logical blocks are grouped into a plurality of logical zones, and a logical zone table is established regarding each logical zone and used for storing the mapping relationship between the logical blocks in the logical zone and the data physical blocks. In the present embodiment, these logical zone tables are stored in the flash memory 130, and a logical zone table is only loaded into the buffer memory 110c when the content thereof is to be read. Besides, in the present embodiment, the physical blocks 130-1~130-N are alternatively substituted as a whole. In other words, the physical blocks 130-1~130-N are not grouped into any physical zone to correspond to the logical zones. FIG. 4 is a diagram of block management according to an embodiment of the present invention. Referring to FIG. 4, in order to manage a large number of logical blocks with limited system resources, the logical blocks are grouped into a plurality of logical zones LZ1, LZ2, . . . , and LZP, while the physical blocks 130-0~130-N are not grouped into any zone; instead, all the physical blocks are substituted alternatively as a whole. In order words, as in FIG. 1, L physical blocks in each physical zone are alternatively substituted respectively, while as in FIG. 4, all the N (N=P×L) physical blocks are alternatively substituted.

The block management method provided by the present invention will be described below with reference to FIG. 4.

Figure 5:
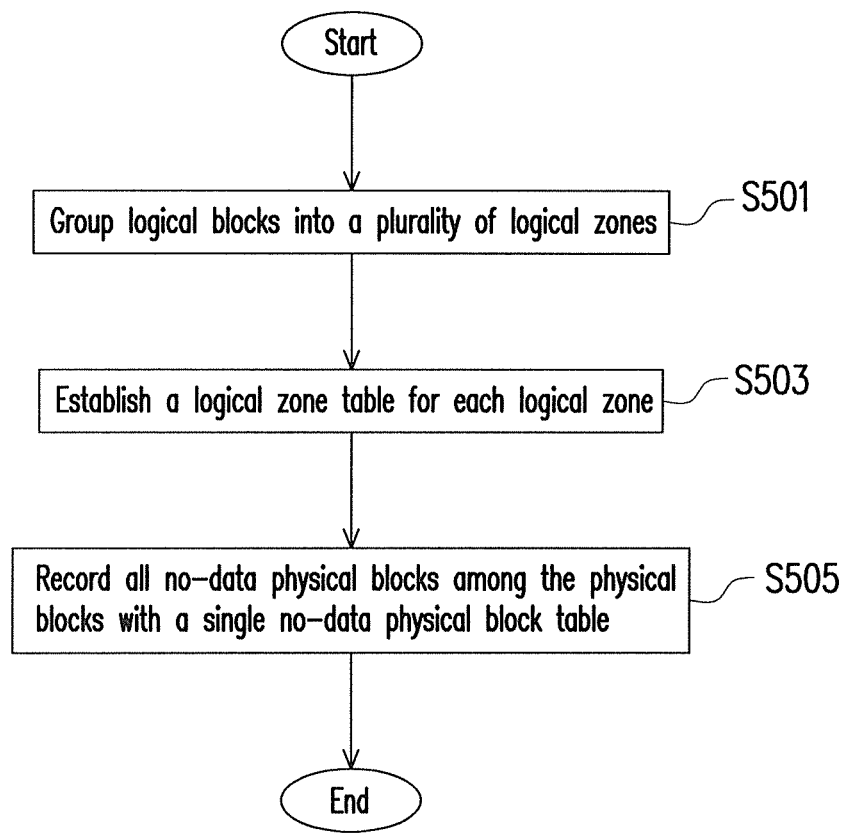
FIG. 5 is a flowchart of a block management method according to an embodiment of the present invention.

FIG. 5 is a flowchart of a block management method according to an embodiment of the present invention.

Referring to FIG. 5, while initializing the flash memory storage system 100, in step S501, the memory management module 110d groups the logical blocks defined in the flash memory 130 into a plurality of logical zones. Then, in step S503, the memory management module 110d establishes a logical zone table for each logical zone, wherein the logical zone table records the mapping relationship between each logical block in the logical zone and the data physical blocks among all the physical blocks. In step S505, the memory management module 110d records all the no-data physical blocks among the physical blocks with a single no-data physical block table, wherein the no-data physical blocks are used by the flash memory storage system 100 for substituting the physical blocks to write data into the flash memory 130.

According to the block management method provided by the present invention, since the logical blocks are grouped into a plurality of logical zones, when the host 200 accesses the flash memory storage system, only the logical zone table corresponding to the logical zone to which the logical block to be accessed belongs is opened for obtaining the physical block corresponding to the logical block and the corresponding physical block corresponding to the logical block is updated after the data is written. Accordingly, the mapping relationship between the logical blocks and the physical blocks of the flash memory 130 can be managed and maintained with limited storage space of the buffer memory 110c. Besides, by recording all the available no-data physical blocks with the single no-data physical block table, all the physical blocks in the flash memory can be alternatively substituted as a whole, so that frequent access to specific physical blocks can be avoided and the lifespan of the flash memory can be prolonged.

Additionally, a bad physical block table may be further adopted in the present embodiment for recording all the bad physical blocks in the flash memory 130, so that the flash memory controller 110 won't use those damaged physical blocks for storing data.

In the present embodiment, when the host 200 is about to write data into the flash memory storage system 100, the memory management module 110d selects no-data physical blocks from the spare area 206 according to the no-data physical block table for writing the data and substituting the data physical blocks in the data area 204.

FIG. 6 is a flowchart illustrating how a data is written into the flash memory storage system 100 according to an embodiment of the present invention.

Referring to FIG. 6, in step S601, whether the logical zone table corresponding to the logical block to be written is stored in the buffer memory 110c is determined. If it is determined in step S601 that the logical zone table corresponding to the logical block to be written is not stored in the buffer memory 110c, then in step S603, the corresponding logical zone table is loaded from the flash memory 130 into the buffer memory 110c. After that, in step S605, a physical block is selected from all the no-data physical blocks according to the no-data physical block table, and in step S607, the data is written into the selected physical block (as shown in FIGS. 3A-3C). Next, in step S609, the physical block corresponding to the logical block to be written is updated into the selected physical block, the selected physical block is deleted from the no-data physical block table, and the original data physical block corresponding to the logical block to be written is added into the no-data physical block table.

Similarly, only the corresponding logical zone table is read when the host 200 is about to read data from the flash memory storage system 100.

Figure 7:
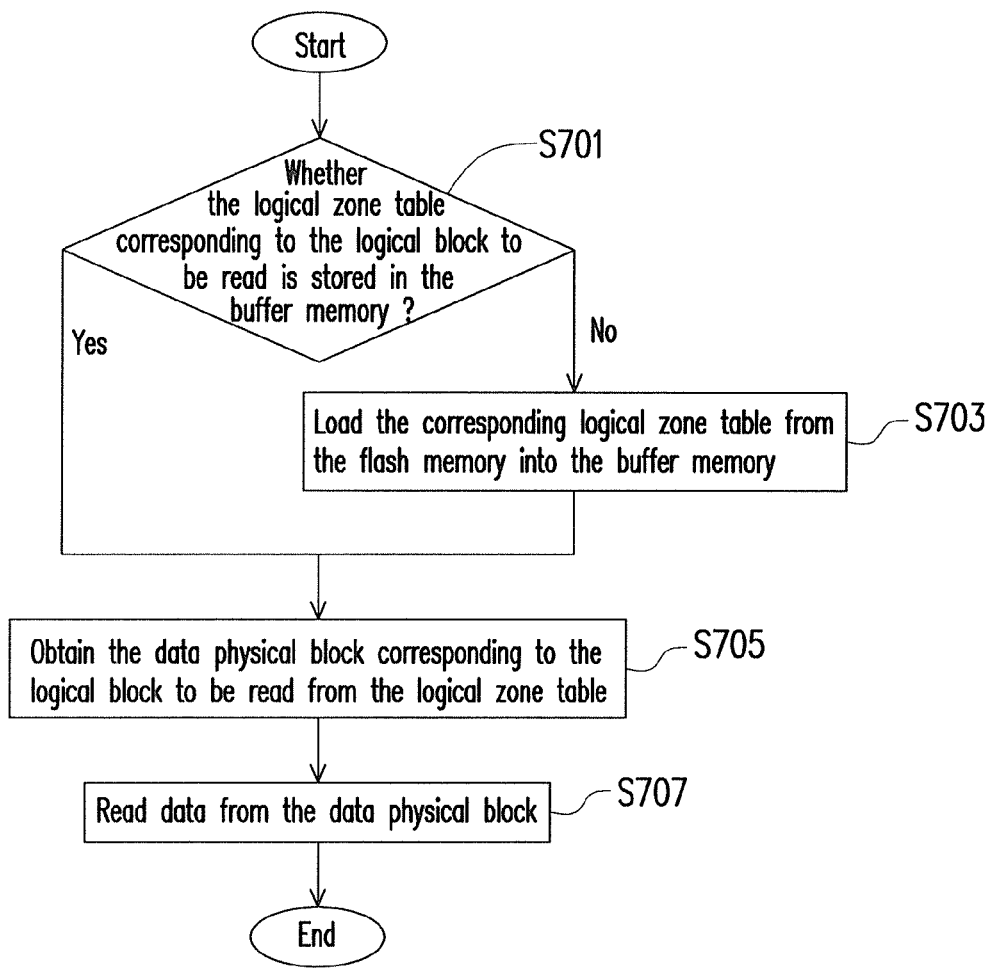
FIG. 7 is a flowchart illustrating how a data is read from a flash memory storage system according to an embodiment of the present invention.

FIG. 7 is a flowchart illustrating how a data is read from a flash memory storage system 100 according to an embodiment of the present invention.

Referring to FIG. 7, in step S701, whether the logical zone table corresponding to the logical block to be read is stored in the buffer memory 110c is determined. If it is determined in step S701 that the logical zone table corresponding to the logical block to be written is not stored in the buffer memory 110c, then in step S703, the corresponding logical zone table is loaded from the flash memory 130 into the buffer memory 110c. After that, in step S705, the data physical block corresponding to the logical block to be read is obtained from the logical zone table, and in step S707, data is read from the data physical block.

It should be mentioned that in another embodiment of the present invention, the block management method (process), the data writing method (process), and the data reading method (process) are implemented with program codes (firmware) and are stored in a storage unit (not shown) of the flash memory controller 110, and these program codes are executed by the microprocessor unit 110a of the flash memory controller 110.

In summary, according to the present invention, a single no-data physical block table is adopted for recording all the no-data physical blocks in a flash memory, and a physical block corresponding to a logical block in any logical zone is selected from all the available no-data physical blocks according to the no-data physical block table. Thereby, frequent access to specific physical blocks can be avoided when a user writes data into a specific logical zone repeatedly and accordingly the lifespan of the flash memory can be prolonged. Moreover, the conventional problem that a physical zone becomes unavailable due to too many bad blocks therein is resolved and accordingly the production yield is improved. Furthermore, it is not needed to establish a mapping relationship between each logical zone and any physical zone, and accordingly the system performance is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A block management method, for managing mapping relationships between a plurality of logical blocks and a plurality of physical blocks of a flash memory, the block management method comprising:

grouping the logical blocks into a plurality of logical zones;

grouping the physical blocks into at least a data area and a spare area, wherein the physical block of the spare area are not grouped into a plurality of zones;

respectively mapping the logical blocks to the physical blocks of the flash memory, wherein the physical blocks mapping to the logical blocks of the logical zones are selected from the physical blocks of the data area;

recording mapping relationships between the logical blocks of the logical zones and the physical blocks of the data area respectively into a corresponding logical zone table for each of the logical zones; and recording the physical blocks of the spare area with a no-data physical block table.

2. The block management method according to claim 1, wherein the physical blocks of the data area have stored data and corresponds to the logical blocks, wherein the physical blocks of the spare area are blank or available blocks.

3. The block management method according to claim 1, wherein the no-data physical block table is a single table recording all of the physical blocks of the spare area.

4. The block management method according to claim 1, further comprising:

selecting a first physical block from the spare area according to the no-data physical block table when data is written into a first logical block among the logical blocks of the logical zones, wherein the first logical block initially maps to a second physical block among the physical blocks of the data area.

5. The block management method according to claim 4, further comprising:

updating the mapping relationships in the corresponding logical zone table to map the first physical block to the first logical blocks; and deleting the first physical block from the no-data physical block table.

6. A block management method, for managing mapping relationships between a plurality of logical blocks and a plurality of physical blocks of a flash memory, the block management method comprising:

grouping the logical blocks into a plurality of logical zones;

establishing a plurality of logical zone tables respectively for the logical zones;

grouping the physical blocks into at least a data area and a spare area;

establishing a no-data physical block table for recording no-data physical blocks of the flash memory, wherein the no-data physical blocks are the physical blocks of the spare area; and selecting a first physical block from the spare area according to the no-data physical block table when data is written into a first logical block among the logical blocks of the logical zones, wherein the first logical block initially maps to a second physical block among the physical blocks of the data area.

7. The block management method according to claim 6, wherein the no-data physical blocks are no data is recorded in the no-data physical blocks or data recorded in the no-data physical blocks has been marked as invalid data.

8. The block management method according to claim 6, wherein the physical blocks of the data area have stored data and corresponds to the logical blocks, wherein the physical blocks of the spare area are blank or available blocks.

9. The block management method according to claim 6, wherein the no-data physical block table is a single table recording all of the physical blocks of the spare area.

10. The block management method according to claim 6, further comprising:

updating the mapping relationships in a corresponding logical zone table among the logical zone tables to map the first physical block to the first logical blocks; and deleting the first physical block from the no-data physical block table.

11. A flash memory storage system, comprising:

a transmission interface configured to connect to a host;

a flash memory having a plurality of physical blocks; and a flash memory controller electrically connected to the transmission interface and the flash memory, wherein the flash memory controller configures a plurality of logical blocks and groups a plurality of logical blocks into a plurality of logical zones, wherein the flash memory controller groups the physical blocks into at least a data area and a spare area, wherein the physical block of the spare area are not grouped into a plurality of zones, wherein the flash memory controller respectively maps the logical blocks to the physical blocks of the flash memory, wherein the physical blocks mapping to the logical blocks of the logical zones are selected from the physical blocks of the data area, wherein the flash memory controller records mapping relationships between the logical blocks of the logical zones and the physical blocks of the data area respectively into a corresponding logical zone table for each of the logical zones and records the physical blocks of the spare area with a no-data physical block table.

12. The flash memory storage system according to claim 11, wherein the physical blocks of the data area have stored data and corresponds to the logical blocks, wherein the physical blocks of the spare area are blank or available blocks.

13. The flash memory storage system according to claim 11, the no-data physical block table is a single table recording all of the physical blocks of the spare area.

14. The flash memory storage system according to claim 11, wherein the flash memory controller selects a first physical block from the spare area according to the no-data physical block table when the host writes data into a first logical block among the logical blocks of the logical zones, wherein the first logical block initially maps to a second physical block among the physical blocks of the data area.

15. The flash memory storage system according to claim 14, wherein the flash memory controller updates the mapping relationships in the corresponding logical zone table to map the first physical block to the first logical blocks, wherein the flash memory controller deletes the first physical block from the no-data physical block table.

16. A flash memory storage system, comprising:

a transmission interface configured to connect to a host;

a flash memory having a plurality of physical blocks; and a flash memory controller electrically connected to the transmission interface and the flash memory, wherein the flash memory controller configures a plurality of logical blocks and groups a plurality of logical blocks into a plurality of logical zones, wherein the flash memory controller establishes a plurality of logical zone tables respectively for the logical zones, wherein the flash memory controller groups the physical blocks into at least a data area and a spare area, wherein the flash memory controller establishes a no-data physical block table for recording no-data physical blocks of the flash memory, wherein the no-data physical blocks are the physical blocks of the spare area wherein the flash memory controller selects a first physical block from the spare area according to the no-data physical block table when data is written into a first logical block among the logical blocks of the logical zones, wherein the first logical block initially maps to a second physical block among the physical blocks of the data area.

17. The flash memory storage system according to claim 16, wherein the no-data physical blocks are no data is recorded in the no-data physical blocks or data recorded in the no-data physical blocks has been marked as invalid data.

18. The flash memory storage system according to claim 16, wherein the physical blocks of the data area have stored data and corresponds to the logical blocks,
   wherein the physical blocks of the spare area are blank or available blocks.

19. The flash memory storage system according to claim 16, wherein the no-data physical block table is a single table recording all of the physical blocks of the spare area.

20. The flash memory storage system according to claim 16,
   wherein the flash memory controller updates the mapping relationships in a corresponding logical zone table among the logical zone tables to map the first physical block to the first logical blocks,
   wherein the flash memory controller deletes the first physical block from the no-data physical block table.

* * * * *